INVENTOR
John J. Shively
BY
Van Deventer & Grier
ATTORNEYS

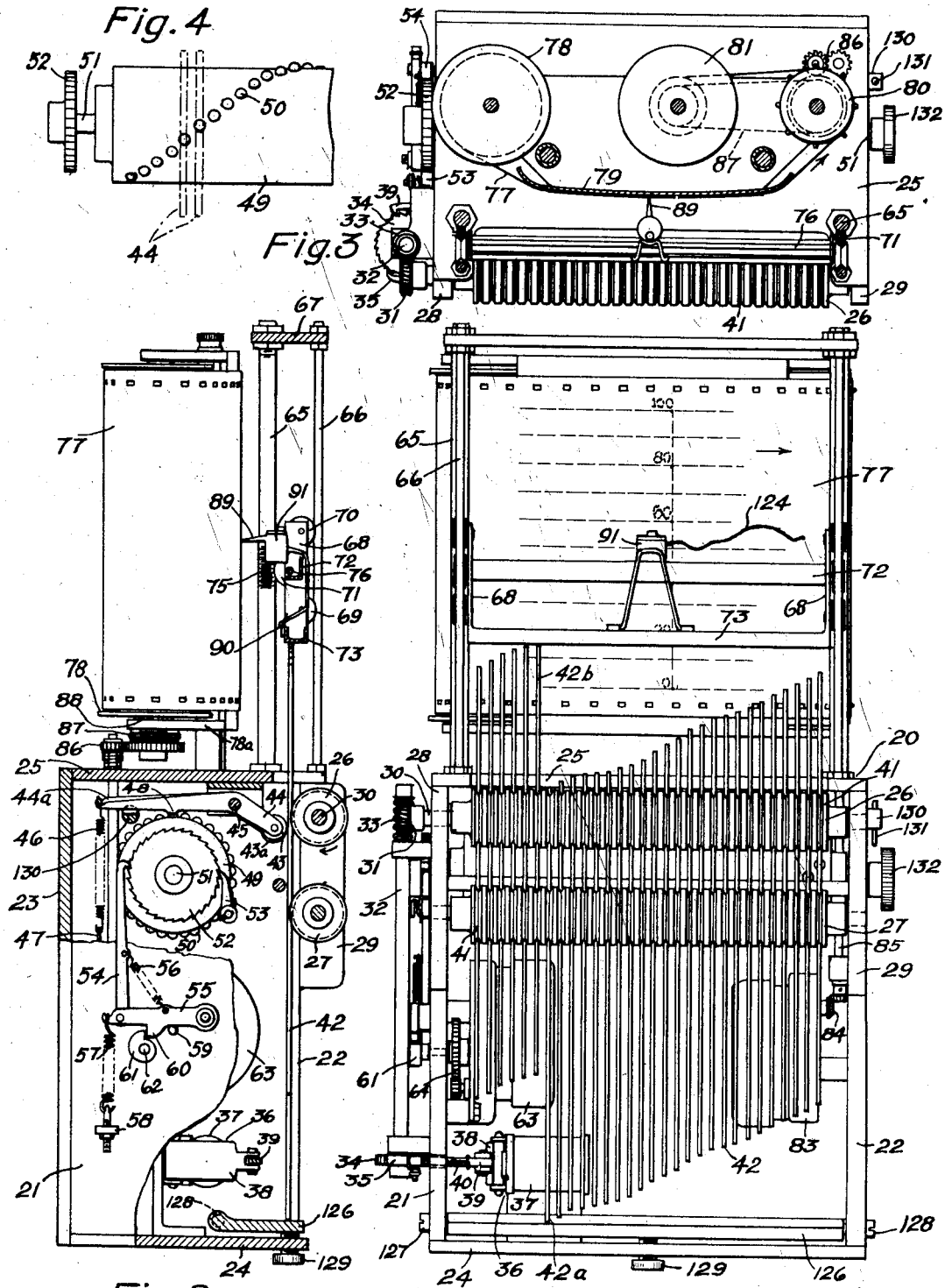
March 28, 1944.  J. J. SHIVELY  2,345,184
RATIO DETERMINING DEVICE
Filed Oct. 21, 1939  3 Sheets-Sheet 1
INVENTOR
John J. Shively.
BY
Van Deventer & Grier
ATTORNEYS March 28, 1944.  J. J. SHIVELY  2,345,184
RATIO DETERMINING DEVICE
Filed Oct. 21, 1939  3 Sheets-Sheet 2
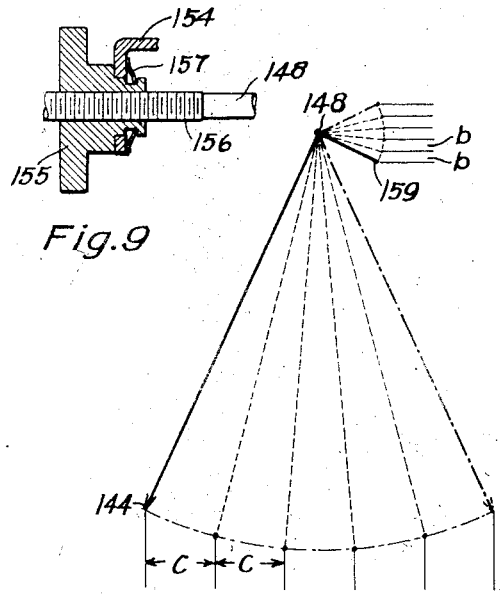
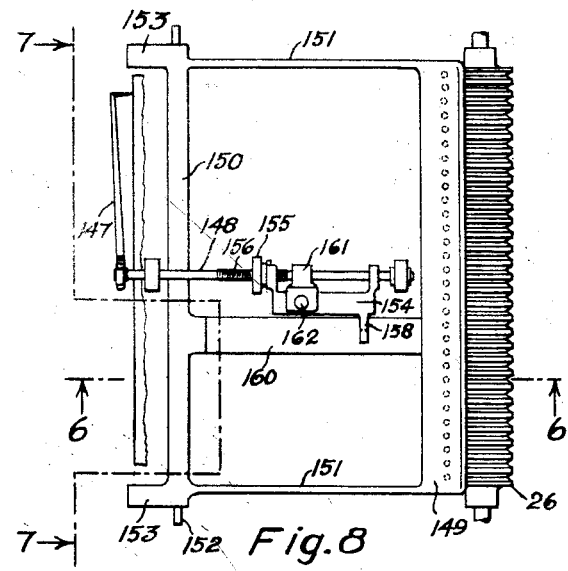
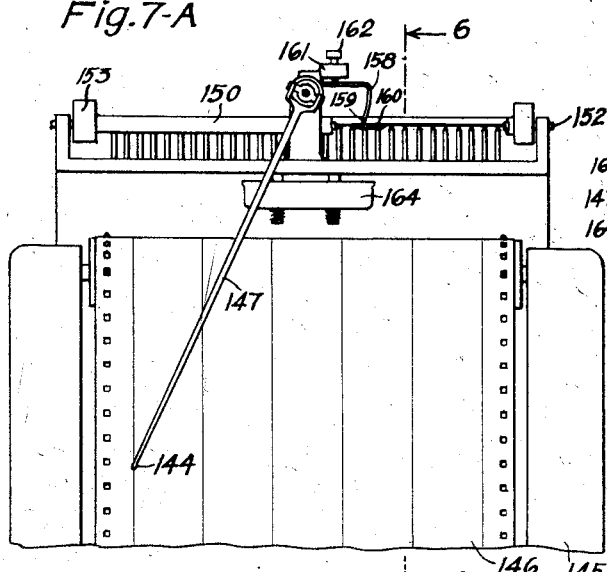
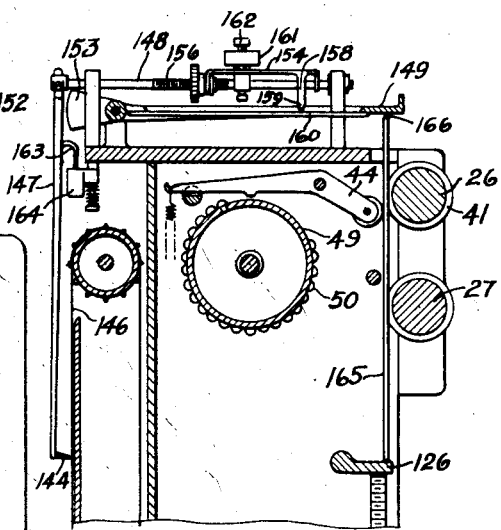
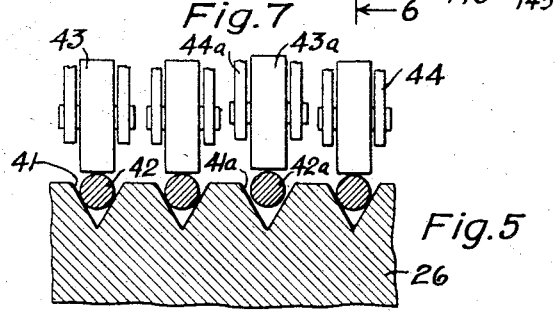
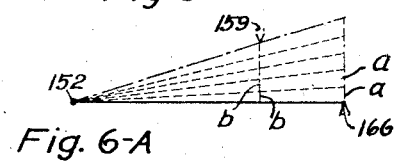
INVENTOR
John J. Shively
BY
Van Deventer + Grier
ATTORNEYS March 28, 1944. J. J. SHIVELY 2,345,184
RATIO DETERMINING DEVICE
Filed Oct. 21, 1939 3 Sheets-Sheet 3

Patented Mar. 28, 1944

2,345,184

UNITED STATES PATENT OFFICE 2,345,184

RATIO DETERMINING DEVICE

John J. Shively, New York, N. Y.

Application October 21, 1939, Serial No. 300,674

5 Claims. (Cl. 234—5.5)

This invention relates to improvements in ratio determining devices.

An object of the invention is to provide means to determine the relationship between two variable factors.

A further object is to provide means of the above type in which the rates of variation of one or both factors may be variable.

Another object is to provide means of the above type by which determination of the relationship may be substantially continuous.

Another object is to provide means of the above type adapted to establish the ratio between cumulative quantities.

Another object is to provide means to create a substantially continuous record of the above determined ratios with respect to a third factor.

Another object is to provide a device of the above nature adapted to the substantially continuous determination of interval power demand.

A still further object is to provide means of the above nature to maintain a substantially continuous record of the time-interval demand.

Other objects and advantages of the invention, will become evident during the course of the following description in connection with the accompanying drawings, in which:

Figure 1 is a front elevation of one form of the invention;

Figure 2 is a side view of the same partly in section;

Figure 3 is a top view of the same partly in section;

Figure 4 is a fragmental detail view of the tripping drum;

Figure 5 is a fragmental detail sectional view of the elevating drum and related parts;

Figure 6 is a vertical partial sectional view of the device showing an alternative form of recording mechanism, the section being taken in the plane 6—6, Figures 7 and 8;

Figure 10:
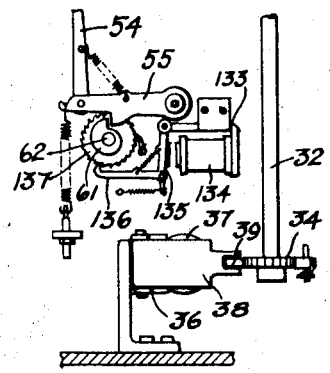
Figure 11:
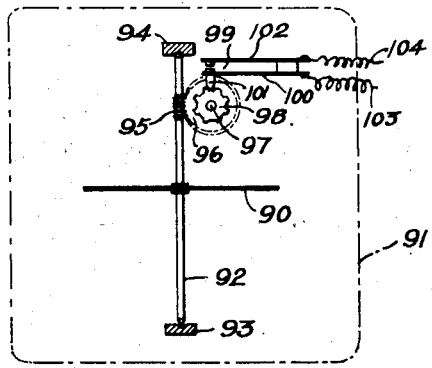
Figure 12:
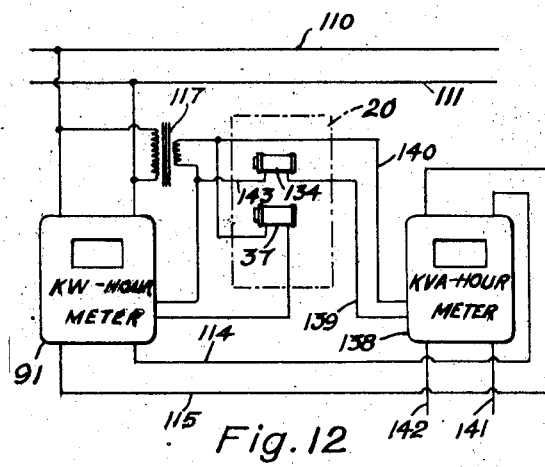
Figure 13:
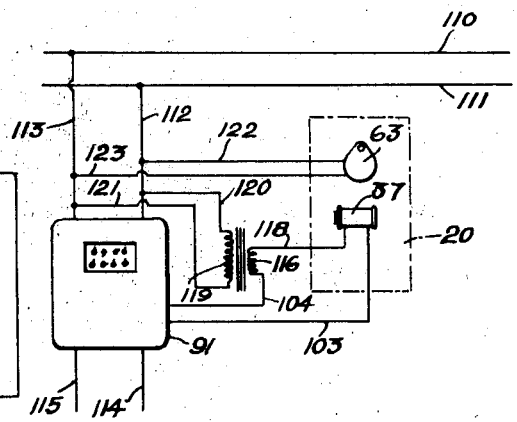
Figure 14:
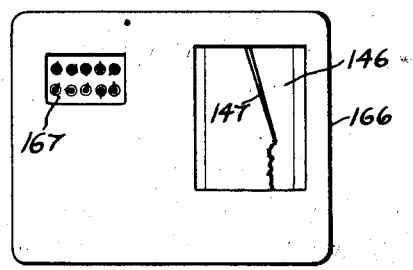
Figure 15:
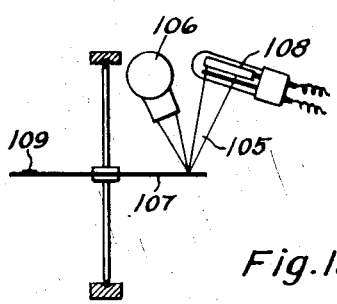
Figures 16, 17:
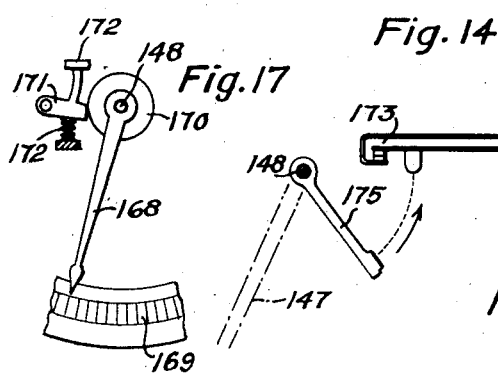
Figure 18:
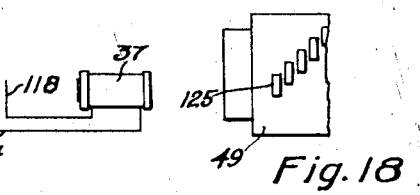

Figure 6—A is a diagram illustrating the geometry of the recording mechanism relating to Figure 6;

Figure 7 is a front elevation of the device shown in Figure 6;

Figure 7—A is a geometrical diagram relating to Figure 7;

Figure 8 is a top view of the recording linkage and related parts shown in Figures 6 and 7;

Figure 9 is a detail view of means to vary and adjust the operation of the recording mechanism;

Figure 10 is a detail diagrammatic view of actuating means responsive to two variable factors;

Figure 11 is a diagrammatic illustration of means to initiate control impulses for the device from an electric meter or the like;

Figure 12 is an electrical diagram showing the connections of the actuating means, Figure 10, with suitable meters;

Figure 13 is a similar diagram in which control is exercised jointly by a meter and a synchronous clock or the like;

Figure 14 is an exterior view of a unitary structure including the meter and the ratio-establishing device;

Figure 15 illustrates photoelectric means for deriving impulses for the device from a meter disk;

Figure 16 shows an overload breaker to prevent injury to the mechanism by loads beyond its capacity;

Figure 17 shows a maximum indicating means for use when a continuous record is not desired; and Figure 18 is a fragmental detail view of an alternate form of tripping drum structure.

Referring to Figure 1, the numeral 20 generally indicates a ratio determining mechanism having a frame comprising side plates 21 and 22, a rear plate 23, a bottom plate 24 and a top plate 25. Two elongated rollers 26 and 27 are journalled one above the other in blocks 28 and 29 secured to the front of the side plates 21 and 22.

The shaft 30 of the upper roller 26 extends outward beyond the journal block 28 and has secured thereon a worm gear 31, Figures 1 and 3. A vertical shaft 32 carries on its upper end a worm 33 meshing with the gear 31 and on its lower end a ratchet wheel 34.

The ratchet wheel 34 is equipped with a spring pressed holding pawl 35 and may be driven by any suitable type of magnetic notching device 36, herein illustrated as having an electromagnet 37, a swinging armature 38 cooperative with the magnet, and an elongated hook-shaped pawl 39 pivoted to the armature 38 and normally held forward and in engagement with the ratchet 34 by a small tension spring 40, the spring being secured to the side plate 21. It will be seen that when the magnet 37 is energized to attract the armature 38, the hook pawl 39 is drawn inward to rotate or notch the ratchet 34 clockwise, Figure 3. The rotation of the ratchet 34 operating through the vertical shaft 32, worm 33 and gear 21, revolves the roller 26 clockwise, Figure 2, through a small angle predetermined by the notching angle of the ratchet and ratio of the worm gearing.

The rollers 26 and 27 have in their peripheries a plurality of V grooves 41 of accurately predetermined depth and angularity, illustrated in enlarged detail in Figure 5. A plurality of slender rods 42 of equal length, hereinafter referred to as elevating or determining rods or members, are disposed behind the rollers 26 and 27 so as to engage the grooves 41. The rollers and rods may be made of various materials, but in the embodiment illustrated are made of hard material such as steel or the like. The rods are of accurately uniform diameter so that when pressed into their respective grooves 41 they engage the latter in pitch circles of the same diameter throughout.

Rollers 43, Figures 2 and 5, are disposed behind the rods 42 in the ends of angular levers 44 rockably retained on a transverse rod 45. Tension springs 46, linked between the rear ends of levers 44 and a transverse strip 47, Figure 2, normally press the rollers 43 against the rods 42 and hold the latter in frictional engagement with the sides of grooves 41 with a pressure sufficient to prevent slip between the grooves and rods under the light driving load which must be carried as hereinafter set forth.

The levers 44 have on their lower sides short extensions 48 overlying but clearing the periphery of a tripping drum 49, shown in detail in Figure 4. A plurality of cam bosses 50, one for each lever 44, are disposed in one complete helical turn around the drum 49, the longitudinal spacing being such that during a complete turn of the drum each boss 50 passes directly under its respective lever 44, engages its extension 48 and rocks the lever clockwise, Figure 2. When any lever, for example 44a in Figures 2 and 5, is rocked by its cam boss 50, the roller 43a is moved rearwardly as shown in Figure 5, thus removing the pressure from the rod 42a and releasing the latter from frictional driving engagement with the groove 41a. As soon as a boss 50 moves past the extension 48 of its lever 44, the latter is released again allowing the spring 46 to press the rod into engagement with the driving groove.

From the foregoing it will be evident that during one complete revolution of the drum 49 all the rods 42 are successively released or tripped out of driving engagement with the roller 26, each rod remaining out of engagement while the extension 48 of the corresponding lever 44 is held upward by its cam boss 50.

The drum 49 carries on the outer end of its shaft 51 a ratchet wheel 52 as shown in Figure 4, held from reverse rotation by a second spring pressed pawl 53, Figures 2 and 3. It will be understood that the shaft 51 is journalled in the side plate 21 and that the pawl 53 is pivotally attached thereto but for purposes of clarity the side plate 21 has been partially cut away in Figure 2 to disclose the relation of the working parts.

The ratchet 52 has a number of teeth equal to the number of cam bosses 50 on the drum 49, and the holding pawl 53 is so located that in each stop position one lever 44 is held elevated by its respective cam boss.

A second elongated and hook-shaped driving pawl 54 is pivoted at its lower end to a horizontal lever 55 which in turn is pivotally mounted on the side plate 21. A light diagonal tension spring 56, connected between the pawl 54 and lever 55, holds the former in engagement with the ratchet 52. A stronger tension spring 57, hereinafter referred to as the tripper spring, is adjustably fastened to a stationary lug 58 at the bottom and engages the end of lever 55 to urge the latter downward against a suitable stop 59.

The lever 55 has a downwardly extending trip latch 60 adapted to be engaged by a spiral cam 61, the latter being secured to a short shaft 62 journalled in the end plate 21. When the cam 61 is revolved counter-clockwise, Figure 2, its gradually increasing diameter forces the lever 55 upward throughout the revolution, thus "cocking" the spring 57 and advancing the pawl 54 one tooth on the ratchet 52. As the cam lobe over-rides the latch 60 into tripping position, the spring 57 snaps the lever 55 and pawl 54 downward as shown in Figure 2, thus revolving the ratchet 52 and drum 49 an amount equal to the angular advance of one tooth of the ratchet. This angular distance is equal to that between successive cam bosses 50 on the drum 49, so that for each tripping of the lever 55 and incremental rotation of the drum 49, one lever 44 is released by its cam boss 50 and the next successive lever 44 is raised by its cam boss. Thus for each rotation of the cam 61 one of the rods 42 is tripped or released from the drum 26 and the rod previously released is reengaged therewith. Since the tripping is accomplished by sudden release of the cocked spring 57, both the release and re-engagement of the rods is practically instantaneous.

In the embodiment illustrated in Figures 1 to 3, wherein the invention is applied to an alternating current demand meter, the cam 61 is revolved by a small synchronous clock motor 63 through suitable reduction gearing 64, Figure 1. It will be understood, however, that the cam 61 may be revolved by other suitable means such as that hereinafter described in connection with Figure 10, depending on the type of service to which the device is to be applied.

Vertical rear and front guide rods 65 and 66, secured to the top plate 25 and to an upper brace plate 67, form vertical runways for light side carriages 68 each having grooved rollers 69 and 70 engaging the rods 66 and single concave rear wheels 71 engaging the rear rods 65. Light but rigid cross members 72 and 73 connect the carriages 68. The rear guide rods 65 are threaded as indicated at 75, and the rear guide wheels 71 are peripherally hobbed to mesh with the threads of rods 65, the rods 65 and wheels 71 thus acting in the relation of fine toothed racks and pinions. The wheels or pinions 71 are secured on opposite ends of a small but rigid cross shaft 76 journalled in the carriages 68. This positive meshing of the rear guide rods or racks 65 with pinions rigidly connected, and therefore forced to revolve together, prevents cocking of the carriage and cross member assembly and ensures parallelism throughout the vertical movements of this assembly irrespective of the point at which the lifting or supporting force is applied thereto.

The lower transverse member 73, hereinafter referred to as the determining bar, overlies the tops of all the rods 42 so as to be movable vertically by any one or more of the latter as hereinafter explained.

Mounted on the top plate 25 is any suitable type of horizontally moving chart mechanism herein illustrated as having a strip paper chart 77 adapted to be moved from a reel 78 via a platen 79 and a driving sprocket 80 to a second or take-up reel 81. The sprocket 80 is revolved by a second clock motor 83, Figure 1, through bevel gears 84, a vertical shaft 85 and suitable spur gearing 86, Figures 2 and 3. The usual takeup slipping belt 87 maintains the takeup reel 81 firmly wound, and a spring friction washer 88 between the reel 78 and its frame 78a serves to keep the paper 77 taut across the platen 79.

A pen 89 is hinged to the determining bar 73 at 90 and is provided with an ink-well 91. The center of weight of the pen and ink-well is normally disposed rearward of the hinge 90 so that gravity normally holds the pen 89 lightly against the paper chart 77.

Figures 13 and 11 illustrate respectively the electrical connections of the device for determining interval electrical demand and a means of initiating control impulses for the device from a meter disk shaft. Referring to the latter figure, the numeral 90 indicates a rotary disk of a meter 91, the disk 90 being secured to the usual shaft 92 mounted in suitable pivot bearings 93 and 94. A worm 95 on the shaft 92 drives a worm wheel 96 on a second shaft 97, the second shaft also carrying a cam wheel 98. A normally open contactor 99 has a movable member 100 carrying an insulating shoe 101 engaging the cam wheel 98. When the disk 90 revolves the shaft 92 driving the cam wheel 98 through the described gearing, the lobes of wheel 98 successively raise the shoe 101, thus closing a series of contacts between the member 101 and the upper contact member 102 and through these members, between their respective leads 103 and 104, the number of revolutions of the disk per contact or vice versa being dependent on the chosen gear ratio and number of cam lobes. It will be understood that the above described manner of deriving successive circuit closings from a meter shaft or the like is given as purely illustrative, since this may be accomplished in various other ways such as that shown in Figure 15, wherein a light beam 105 from a light source 106 normally reflected by the disk 107 to a photocell 108, is successively interrupted by one or more darkened spots 109 on the disk face. The interruptions of the light to the photocell 108 may be translated into circuit impulses by means well known in the art and therefore not further described herein.

Referring to Figure 13, the numerals 110 and 111 indicate the conductors of a power line, from which input wires 112 and 113 are run to the meter 91, taken for purposes of the present example as representing an A. C. kilowatt hour meter including a circuit closing means such as that shown in Figure 11. Numerals 114 and 115 indicate the meter output leads or load connections. The contactor lead 103 is connected to the magnet 37 of the magnetic notcher 36, Figure 1, and the second contactor lead 104 is connected to one side of the low voltage secondary winding 116 of a small transformer 117, a third lead 118 in turn connecting the other side of winding 116 to the magnet 37. The primary winding 119 of transformer 117 is connected to the conductors 112 and 113 by leads 120 and 121. The purpose of the transformer 116 is to permit the contactor 99 and magnet 37 to operate on low voltage, and if in some cases low voltage operation is not desired, the transformer may be omitted.

The synchronous motor 63, Figures 1 and 2, is connected to the conductors 112 and 113 by leads 122 and 123. Obviously, if desired, the motor 63 and transformer 117 may be connected inside instead of outside the meter, that is to load conductors 114 and/115 instead of input conductors 112 and 113, or across the supply lines at any other suitable point.

In the following explanation of the operation of the invention, the latter is applied as an example to the measurement of interval kilowatt demand. In practice such demand is measured over various intervals or blocks, ordinarily of five minutes, 10 minutes, 15 minutes or 30 minutes. In the usual practice the intervals are definitely set and separated by a tripping device. At the beginning of each interval a pen starting from zero position on a chart, is moved across the chart by the cumulative action of the meter throughout the time interval, and at the end of the interval is tripped back to zero to start the next block, the chart meanwhile being fed forward. The result is a series of recordings, each high point recording representing the demand during its particular and set time interval. Such a procedure, however, does not give a complete or necessarily accurate record of the actual interval demand of the system, due to the fact that heavy demands of considerable duration may occur partly in one block interval and partly in the next, a condition known as "peak-splitting." As an extreme example, the demand may first hold at 10 kilowatts during the first half of a block interval, may then rise to 1000 kilowatts and continue thereat through the remainder of the interval and half-way through the next interval, then fall again to 10 kilowatts and so continue to the end of the second interval. The record produced by the usual means referred to above would show two successive intervals with a demand of 505 kw. in each. Actually, however, during the process there has been a demand of 1000 kw. extending over a time equal to a full interval, but no record of a 1000 kw. interval demand occurs on the chart. Such records are used for ascertaining the maximum interval demand, and it is evident that if the above 1000 kw. actually was the maximum the record would not show it but would be inaccurate by any percentage up to 49.5 percent of error.

In the present invention, it will be understood that any practical number of rods 42 and their related elements may be employed in the structure, depending on the service to which the device is to be put. For purposes of the present explanation, let it be assumed that the apparatus is constructed with thirty-one each of the rods 42, cam bosses 50 and teeth on the ratchet 52, and that it is to be used for recording 5 minute kilowatt demand.

In this case, the cam shaft 62, Figures 1 and 2, is so geared to the synchronous motor 63 as to rotate the cam 61 once in 10 seconds. Thus one of the rods 42 will be tripped every 10 seconds, and all rods will have been tripped once in 5 minutes and 10 seconds. As each rod 42 remains disengaged from the roller 26 during one interval between trippings, namely 10 seconds, it is evident that each rod will have been in engagement with the roller 26 for exactly five minutes.

If any load is on the meter 91, Figures 11 and 13, the rotation of the disk 90 actuates the contactor 99 in the manner previously described to successively close the described circuit from transformer 117 through the notching magnet 37, and the number of current impulses set up in any given time is proportional to the disk revolutions and consequently proportional to the demand.

Each impulse through the magnet 37 causes the latter to attract the armature 38 and draw the hook pawl 39 inward, rotating the ratchet 34 by one tooth distance. The rotation of the ratchet 34 is transmitted through the shaft 32, worm 33 and worm wheel 31 to the elevating roller. From the foregoing it will be seen that during any period of time the roller 26 is incrementally rotated clockwise, Figure 2, by an amount proportional to the revolutions of the meter shaft during that time. Consequently, all rods 42 in engagement with the diametrically equal pitch lines of the grooves 41 for any given length of time are moved upward a distance proportional to the meter demand during that time.

It has been set forth that in the present example each rod 42 is held in engagement exactly five minutes. It follows, therefore, that the total upward travel of each rod represents a measure of the demand during the five minutes prior to its release. So long as there is any load on the meter after the original five minutes following starting, the rod about to be released, for example rod 42b, Figure 1, stands above the following rods which have been in engagement for shorter lengths of time. The transverse determining bar 73, Figure 1, is supported by the highest rod 42b, and the vertical position of the pen 89 and consequently the position of the ink mark made thereby on the strip chart 71 is determined by the height of the rod about to be tripped. As each rod is tripped the next succeeding one takes up the support of the bar 73 and pen 89 until it in turn is tripped. The pen is thus always controlled by the highest rod, and as the chart moves slowly to the right the pen traces a record curve or mark 124, the upper edge of which at any point on a properly calibrated chart indicates the prior 5 minute demand. As each determining rod's travel represents an absolute interval demand, and as these overlapping demand determinations follow each other in rapid succession, it is evident that the curve 124 represents a substantially continuous record of 5 minute interval demand, without regard to any specific or set block. Using thirty one rods 42 as described above, the greatest possible peak-splitting effect which can occur covers a duration of only ten seconds, thus reducing the possible inaccuracy of the record by 96.66 percent as compared to the prior recording means described. Similarly, if 101 rods are used the improvement in accuracy is 99 percent, the greatest possible variation from the absolute, due to peaks, being one-half of one percent. Thus by increasing the number of rods 42 the continuous determination may be carried to any desired limits of precision; however, it will be evident to those skilled in the art that except for special scientific purposes the number of rods need not be large, as with a comparatively small number of rods the invention produces records with precision greater than that of the metering means itself in ordinary service.

In the above mentioned cases wherein a large number of rods is employed the interval between successive trippings may be less than that necessary for the released or idle rod to come properly to rest in zero positions. In such cases, the cam bosses 125, as shown in Figure 18, may be elongated and arranged in overlapping relation on the drum 49. By this means two or more rods 42 may be allowed to idle at the same time, each rod remaining released through two or more tripping periods.

The lower roller 27 acts as a guide for the determining rods 42 and is revolved thereby. The pressure rollers 43, as shown in Figure 2, are disposed at a level slightly below that of the axis of the drive roller 26, and exert the greater part of their force through rods on the roller 26 to provide ample driving friction for elevating the rods without slip. However, a smaller portion of the pressure is exerted between all active rods and the lower roller 27 so that the latter is revolved in unison with the main drive roller 26 and in turn acts as a secondary driver for the rod sustaining the greatest weight, namely the rod controlling the pen 89 at any given time.

A lower cross member 126, supporting the rods when the latter are in their released or zero position and hereinafter referred to as the zero bar, may be hinged at 127 and 128 as shown in Figures 1 and 2 and provided with an adjustable supporting screw 129. A transverse rod 130 rotatably mounted in the side plates 22 and 21, has its middle portion cut away as shown in Figure 2 and underlying the rear portions of the levers 44. The rod 130 has in its outwardly projecting end a short cross pin or handle 131, Figures 1 and 3. When the rod 130 is turned, its cutaway portion acts as a cam to raise the levers 44 and release all engaged rods 42. When it is desired to adjust the device to a newly installed chart strip the rods are released in the above manner while the zero bar 126 is raised or lowered by means of the screw 129 to vertically adjust the zero position of the rods 42 and pen 89.

Obviously the rods 42 may be released in the above manner whenever it is desired to reset the device to zero. For ordinary resetting without adjustment, however, the drum 49 may be manually revolved forward one revolution by means of an exterior knob 132, Figures 1 and 3. This method has the advantage that the rods 42 are released successively, lowering the determining bar 73 and its attached structures by short steps and consequently without shock.

In the foregoing description of operation, the device has been shown as determining a substantially continuous ratio between two cumulative factors, one being kilowatt hour consumption and the other being time taken in equal intervals, and for entering the latter factor in the device the trip cam 61 has been described as operated by the synchronous motor 63. For other ratio determinations the cam 61 may be actuated by other means, also as previously noted, such means being shown in Figure 10 as follows:

Referring to Figure 10, in which the supporting structures have been cut away to show the relation of the parts most clearly, the cam 61 is rotatable by a second magnetic notcher 133 similar to the previously described notcher 36 and comprising an electromagnet 134, an armature 135 pivotally carrying a spring pressed hook pawl 136 and a ratchet 137 secured to the cam shaft 63. When successive current impulses are applied to the magnet 134 the successive swings of the armature 135 cause the ratchet 137 to be rotated and in turn rotate the cam 62 which cocks and releases the trip-lever 55. With this arrangement, it will be seen that the frequency of tripping the lever 55 and thereby successively tripping the rods 42 is in direct relation to the frequency of impulses sent through the magnet 134, and that this arrangement permits the entering of two varying factors in the device for determining substantially the ratio of their average values over a period by supplying impulses proportional to the two factors for energizing the two magnetic notchers 36 and 133 respectively. This function obviously has many uses, of which the following is a simple example:

In Figure 12 the numeral 91 denotes a kw.-hour meter, its contactor leads 103 and 105 being in circuit with the notcher magnet 37 as previously described. The numeral 138 indicates a kva.-hour meter also having therein a suitable contactor (not shown) connected to leads 139 and 140. The kva.-hour meter 138 may be connected in series with the kw.-hour meter by leads 114 and 115, while leads 141 and 142 are provided to connect the meter 138 to the load. The contactor leads are connected in series with the secondary of transformer 117 and the second notching magnet through wires 143, 139 and 140.

It will be understood, of course, that while the main wiring of Figure 2 illustrates a simple single-phase meter arrangement, it is also representative of any desired polyphase system and is intended simply to indicate application of the two meters to the same load.

In operation, impulses derived from the kw.-hour meter 91 actuate the magnet 37 in the manner previously described, causing the rods 42 to be fed upward. At the same time impulses from the kva.-hour meter 138 successively energize the magnet 134 to rotate the ratchet 137 and trip cam 61, Figure 10, thereby successively tripping the rods 42. In this case, however, it will be noted that the tripping interval is determined by the number of impulses per revolution of ratchet 137, this being prearranged by the ratchet ratio and number of contactor closings per revolution of the kva.-hour meter mechanism, in other words, tripping is governed by predetermined increments of kva.-hour accumulation.

Taking again as an example the use of 31 rods 42, and assuming a tripping interval to be determined by 10 kva. hours accumulation, each rod 42 is engaged during the accumulation of 300 kva.-hours, independently of the length of time in which this accumulation occurs. The travel of each rod is in turn determined by the kw.-hour accumulation during the same period of the rod's engagement. Thus the height to which each rod rises represents, with respect to a properly calibrated scale or chart 77, a determination of the ratio of kw.-hour accumulation to a given kva.-hour accumulation, this ratio representing the power factor. For example, if, during the engagement of any rod 42 during the above accumulation of 300 kva.-hours, the kw.-hour meter accumulates 300 kw.-hours, the point to which the pen 89 is raised on the chart 77 represents 100% power factor. If, however, the kw.-hour accumulation is only 200 per 300 kva.-hours, the rise of the controlling rod 42 will be only two-thirds of the above and the pen 89 will indicate and record 66% power factor on the chart. Expressed in another manner, the determined result is a ratio between the speeds of the two meters, either or both of which speeds may be and usually are varying factors. The record 124 traced on the chart in the described case would furnish a substantially continuous record of power factor, independently of the magnitude of the demand.

In substantially the same manner the invention may be employed to determine ratios of any simultaneous functions from which controlling impulses may be applied to it, the record chart in each case of course being properly calibrated for the desired indication. In each case, the action represents a substantially constant process of division in which the elevating factor constitutes the dividend and the tripping factor comprises the divisor. For example, if the second magnetic notcher 133 be controlled by impulses from a cumulative steam flow meter measuring steam input to a turbo-generator and the first magnetic notcher 36 be actuated by impulses from a kw.-hour meter on the generator output, the record produced will be a substantially continuous measure of the over-all efficiency of the turbo-generator. Similarly, if the tripping be controlled from a cumulative oil input meter to an oil-burning generating plant and the rod-elevation be controlled from an output kw.-hour meter, the record produced will continuously show the over-all efficiency of the plant.

In case for any purpose it is desired to obtain a record representing the inverse or reciprocal of any ratio such as the above, this may be done by interchanging the connections between the two controlling elements and the respective magnetic notchers 36 and 133. As hereinafter set forth, the second synchronous motor 83 which actuates the chart moving mechanism may also be replaced with a third magnetic notcher similar to 36 and 133.

The form of the invention shown in Figures 6, 7 and 8 is essentially the same as that already described except that the recording mechanism is modified to employ a swinging pen 144 instead of the straight line motion. The mechanism in this illustration case has its chart mechanism 145 of any suitable type adapted to move the chart 146 vertically, disposed beyond the plate 23 and viewable from the left in Figure 6, the left thus being the front instead of the rear of the device.

The pen arm 147 is hinged to a shaft 148 journaled in a fore-and-aft position on the top of the device. The determining bar 149 forms part of a light but rigid frame 150 having side members 151 and pivoted on a transverse rod 152. Small counterweights 153 may be provided on the frame 150 to minimize the effort necessary to lift the bar 149.

A light yoke member 154 is rotatably and slidably mounted at one end on the pen-arm shaft 148 and at the other end is rotatably mounted on a nut 155, the nut being screwed on a threaded portion 156 of shaft 148 and a spring washer 157 being provided to retain the member 154 on the nut as shown in Figure 9. The yoke member 154 has a downwardly curved arm 158 terminating in a tip 159 which engages a flat plate 160 secured to the frame 150, the upper surface of plate 160 being disposed in the plane of the bottom of bar 159 and the axis of the pivot rod 152 as shown in Figure 6.

A small weighted lever 161, secured to the pen-shaft 148, overlies the yoke member 154 and has an adjusting screw 162 engaging the latter. The screw 162 is normally so adjusted that the arm tip 159 and the pen 144 are at 90° with each other about the center of the shaft 148. The weight of the small lever 161 is sufficient to overbalance and steady the pen arm 147 when the latter is swung to the left of center, as shown in Figure 7. If desired, the screw 162, lever 161 and yoke member 154 may be made of steel and one or more of the members magnetized to cause them to cling together as a unit, thus adding part of the weight of the yoke member to the overbalancing effect on the pen arm.

The pen 144 may be supplied with ink by any suitable means such as a wick tube 163 swinging in a small ink reservoir 164, Figures 6 and 7, these parts being omitted from Figure 8 to preserve maximum clarity in the showing of the pen linkage as previously noted.

In this form of the invention the elevating rods 165 have conical tips 166 giving substantially point contact thereof with the determining bar 149, the rods and bar having surfaces hard enough to normally prevent appreciable wear.

The operation of the determining mechanism is the same throughout as that previously described, except that the bar 149, instead of moving straight upward, swings upward about the pivot rod 152, the plate 160 in turn raising the yoke member 154 and lever 161 to swing the pen 144 across the chart 146.

By reference to the diagrammatic Figure 6—A, it will be seen that by the geometry of similar triangles, upward increments b of movement of the tip 159 are always directly proportional to corresponding upward movements a of the controlling rod tip 166. Referring now to the second diagrammatic Figure 7—A, it is evident that as tip 159 and pen 144 are at right angles to each other about shaft 148, the corresponding horizontal movements c of the pen 144 are directly proportional to the movements b of tip 159. It therefore follows that while the pen 144 swings in an arc, its horizontal travel is always directly proportional to the straight vertical travel of the controlling rod or rods 165, and the lateral calibrations of the chart 146 may consequently be uniform.

In case it is desired to change the ratio of travel between the rods 165 and the pen 144, this may be done by adjusting the nut 155 on the thread 156, thus moving the yoke 154 along the shaft 148 to bring the point of contact of the tip 159 nearer to or farther from the fulcrum rod 152. When all the rods 165 are in initial or reset position as shown in Figures 6, 7 and 8, the face of the plate 160 is preferably parallel to the shaft 148, so that changing the pen ratio as explained above does not alter the zero position of the pen 144. However, if after the proper pen ratio has been established it is desired to make slight adjustments of the zero position with respect to the chart, this may be done in the manner previously described by raising or lowering the hinged zero-bar 126.

When the device is constructed for one specific service, such as recording interval kw. or kva. demand as previously set forth, the ratio-determining mechanism may advantageously be combined as a unitary structure with the metering elements in a suitable casing 166, Figure 14, the meter containing the impulse controlling means shown in Figure 11 and presenting the usual cumulative dials 167, while the control connections shown in Figure 13 are contained within the unitary casing.

As the magnetic notchers 36 and 133 or the motor 63 may be made of ample power, the device is rugged in structure and positive in action. The worm and gear drive of the elevating roller 26 is preferably irreversible, relieving the pawl 35 of ratchet 34 of any back-lash or necessary support of the weight of rods 42. It will be evident to those skilled in the art, however, that in certain cases of large and powerful metering means or the like, the elevating or tripping mechanisms or both may be driven directly from the metering devices by any suitable gearing.

For some services it may be desired simply to indicate the maximum value reached by the determined ratio over a period of time rather than keeping a continuous record of the ratio. For such purposes the pen arm 147, Figure 7, may be replaced by an indicating hand 168 as shown in Figure 17, the hand 168 being cooperative with a fixed dial 169 which replaces the moving chart 146. A drum 170 on the shaft 148 is normally restrained from clockwise movement by a friction pawl 171 pressed by a light spring 172, the drum however being free to move counterclockwise. As the determined ratio increases the hand 168 is swung to the right along the dial 169, but if a decrease in ratio occurs the pawl 171 and drum 170 prevent return of the hand to the left. At the end of any period of time, therefore, the position of the hand indicates on the dial the maximum value of the determined ratio during the period. When the instrument is reset the pawl may be released by depressing a button 172 provided thereon, allowing the shaft 148 and hand 168 to return clockwise to zero position. If simple continuous indication of the desired ratio is required, the pawl 171 and drum 170 may be omitted.

To prevent possible injury to the mechanism by prolonged overloads beyond the capacity of the apparatus, a normally closed breaker 173 may be placed in series between the notching magnet 37 and the contactor lead 103 by means of a wire 174 as shown diagrammatically in Figure 16. An arm 175, secured to the pen shaft 148, is adapted to open the breaker 173 when the pen arm 147 swings to the right to the limit of its capacity, thus disabling the notching circuit and preventing further rotation of the elevating drum 26 until the overload has subsided. Obviously, such a breaker may also be arranged for operation by the cross member 72 in the form of the device shown in Figures 1, 2 and 3.

The longitudinal travel of the strip chart 77 is illustrated in Figure 1 as controlled by the second synchronous motor 83, the chart travel thus being constant with respect to a third factor representing time. However, it has been shown in Figure 10 that the first synchronous motor 63 driving the trip cam 61 may be replaced by the second magnetic notcher 133, and it is obvious that in the same manner a third notcher of the same type may be substituted in the same manner for the second motor 83, thus permitting the chart travel to be controlled by a third factor other than time, which third factor may itself be a variable. An example of the use of such an arrangement would be the continuous determination of the power factor of a motor driving a water pump under increasing load as the pump fills an elevated water tank of uniform diameter from a bottom inlet. In this case, the longitudinal calibrations of the chart would be in terms of water head, the chart travel being suitably controlled by a cumulative flow meter on the water pipe or by a moving depth gage in the tank. In any application of the device the slope of the curve drawn on the chart represents at any point the first differential or rate of variation of the determined ratio with respect to the factor controlling the chart travel.

While the device has been illustrated and described in preferred form, it is not limited to the exact embodiments and uses set forth, as it is obvious that the determining mechanism may be used for many other purposes and that various changes and modifications may be made without departing from the scope of the appended claims.

What is claimed is:

1. In a ratio-determining device, in combination, a driving roller, a plurality of movable parallel rods tangentially disposed with respect to said roller, means to normally hold said rods in frictional driving relation with said roller, means to rotate said roller whereby said rods may be moved, a common movable member engageable in pushing relationship by each of said moving rods and adapted to be positioned thereby, means to successively release said rods from said roller, and means associated with said common movable member to present a continuous indication of the position thereof.

2. In a ratio-determining device, in combination, a driving roller, a plurality of parallel rods disposed tangentially with respect to said roller, said rods having a common zero position, means to impart rotation to said roller, means to successively place said rods in driving engagement with said roller during overlapping time intervals whereby said rods may be moved distances proportional to the rotation of said roller during said intervals, means to determine the duration of said intervals, and common means successively operable by each of said engaged rods to indicate the terminal positions of said rods relative to said zero position.

3. The combination claimed in claim 2 wherein said interval determining means includes a constant speed motor and tripping mechanism associated with said rods and operable by said motor whether said overlapping intervals may be of equal duration.

4. In a device of the character described, in combination, a frame, a rotatable elevating roller journalled therein, a rotatable drum journalled in said frame and having its axis parallel to the axis of said roller, a plurality of vertically movable rods adjacent said roller, a plurality of levers pivotally mounted in said frame and adjacent said drum, pressure rollers on said levers and adapted to individually engage said rods, resilient means attached to said levers for normally pressing said pressure rollers against said rods to hold said rods in driving engagement with said elevating roller, a plurality of cam members on said drum and adapted to individually move said levers to release said rods from said elevating roller, said cam members being disposed helically about said drum whereby said rods may be successively released during rotation of said drum, a movable bar overlying all said rods and adapted to be successively supported and positioned by each of said rods, and means associated with said bar to trace a record corresponding to the successive relative positions of said bar.

5. In an interval demand recording device, in combination, a frame, a rotatable elevating roller journalled therein, said roller having a plurality of circumferential grooves, a plurality of parallel rods of equal length adjacent said roller and adapted to be elevated thereby, a common stop member underlying said rods, means to rotate said roller, means to successively engage said rods with said grooves in driving relation during successive overlapping time intervals and to successively release said rods at the termination of said intervals whereby said rods may be elevated during said periods and thereafter may return by gravity to said stop member, a common bar movably attached to said frame and overlying said rods and adapted to be successively engaged by each of said rods whereby said bar may be continuously supported and positioned by the highest of said rods, a record chart on said frame, means to move said chart, and means controllable by movements of said bar to trace a record on said chart, said record having amplitude proportional to the amplitude of movement of said bar.

JOHN J. SHIVELY.